(12) United States Patent
Hill (10) Patent No.: US 7,706,393 B2
(45) Date of Patent: Apr. 27, 2010

(54) PACKET SWITCHING

(75) Inventor: Alan M Hill, Woodbridge (GB)

(73) Assignee: British Telecommunications Public Limited Company, London (GB)

( * ) Notice: Subject to any disclaimer, the term of this patent is extended or adjusted under 35 U.S.C. 154(b) by 1477 days.

(21) Appl. No.: 10/203,555

(22) PCT Filed: Mar. 6, 2001

(86) PCT No.: PCT/GB01/00972

§ 371 (c)(1),
(2), (4) Date: Aug. 12, 2002

(87) PCT Pub. No.: WO01/67803

PCT Pub. Date: Sep. 13, 2001

(65) Prior Publication Data

US 2003/0035422 A1 Feb. 20, 2003

(30) Foreign Application Priority Data

Mar. 10, 2000 (GB) .................................. 0006084.8

(51) Int. Cl.
*H04L 12/28* (2006.01)
*H04L 12/56* (2006.01)
(52) U.S. Cl. ...................................... 370/422
(58) Field of Classification Search .......... 370/414, 370/415–416, 422
See application file for complete search history.

(56) References Cited

U.S. PATENT DOCUMENTS

| | | | |
|---|---|---|---|
| 5,469,154 A | 11/1995 | Karp | |
| 5,940,389 A | 8/1999 | Yang et al. | |
| 5,978,359 A * | 11/1999 | Caldara et al. | 370/236 |
| 6,125,112 A | 9/2000 | Koning et al. | |
| 6,292,492 B1 * | 9/2001 | Bonomi et al. | 370/415 |
| 6,434,115 B1 * | 8/2002 | Schwartz et al. | 370/235 |
| 6,477,169 B1 * | 11/2002 | Angle et al. | 370/395.42 |
| 7,403,524 B2 | 7/2008 | Hill | |

(Continued)

OTHER PUBLICATIONS

EPO Examination Report, Appln. 01910025.4, dated Apr. 3, 2006.

(Continued)

*Primary Examiner*—Kevin C Harper
(74) *Attorney, Agent, or Firm*—Nixon & Vanderhye P.C.

(57) ABSTRACT

A method of allocating switch requests within a packet switch, the method comprising the steps of collecting switch request data at each input port; processing the switch request data for each input port to generate request data for each input port-output port pairing: comparing the number of requests from each input port and to each output port with the maximum request capacity of each input port and each output port; satisfying all requests for those input-output pairs where the total number of requests is less than or equal to the maximum request capacity of each input port and each output port; reducing the number of requests for those input-output pairs where the total number of requests is greater than the maximum request capacity of each input port and each output port such that the number of requests is less than or equal to the maximum request capacity of each input port and each output port; and satisfying the remaining requests. Packets may be switched from an input port to a specified output port in accordance with the allocations obtained with the above method.

7 Claims, 7 Drawing Sheets

U.S. PATENT DOCUMENTS

2003/0174701 A1* 9/2003 Angle et al. ................ 370/390
2004/0264469 A1* 12/2004 Choi ....................... 370/395.1
2005/0271046 A1* 12/2005 Bianco et al. .............. 370/386

OTHER PUBLICATIONS

Marchok et al., "First Stage Multicasting in a Growable Packet (ATM) Switch", Proceedings in the International Conference on Communications, US, New York, IEEE, pp. 1007-1013, XP000269636 ISBN: 0-7803-0006-8.

Collier et al., "Cell-Level Path Allocation in a Three-Stage ATM Switch", International Conference on Communications (ICC), US, New York, IEEE, pp. 1179-1183, XP000438687.

Collier, Martin, "High-Speed Cell-Level Path Allocation in a Three-Stage ATM Switch," School of Electronic Engineering, Dublin City University, pp. 1-7.

Rana, D., "A control algorithm for 3-stage non-blocking networks," Dec. 6-9, 1992, Global Telecommunications Conference, 1992, Conference Record, GLOBECOM '92, 'Communication for Global Users,' IEEE, p. 1477-1481, vol. 3.

Collier, M., High-speed cell-level path allocation in a three-stage ATM switch, Nov. 28-Dec. 2, 1994, Global Telecommunications Conference, 1994, GLOBECOM '94, 'Communications: The Global Bridge,' IEEE, p. 324-328, vol. 1.

Lin, Jeen-Fong et al., High-performance low-cost non-blocking switch for ATM, Mar. 24-28, 1996, INFOCOM '96, Fifteenth Annual Joint Conference of the IEEE Computer Societies, Networking the Next Generation, Proceedings IEEE, p. 818-821, vol. 2.

Lee, T.T.; Soung-Yue Liew; Parallel routing algorithms in Benes-Clos networks; INFOCOM '96, Fifteenth Annual Joint Conference of the IEEE Computer Societies, Networking the Next Generation, Proceedings IEEE, Vol. 1, Mar. 24-28, 1996, p. 279-286, vol. 1.

* cited by examiner

PACKET SWITCHING

This application is the US national phase of international application PCT/GB01/00972 filed 6 Mar. 2001 which designated the U.S.

FIELD OF TECHNOLOGY

This invention relates to packet switching (or cell switching), in particular methods for allocating requests for switching from one of the inputs of a packet switch to one of the outputs of the packet switch.

BACKGROUND

Input-buffered cell switches and packet routers are potentially the highest possible bandwidth switches for any given fabric and memory technologies, but such devices require scheduling algorithms to resolve input and output contentions. Two approaches to packet or cell scheduling exist (see, for example, A Hung et al, "ATM input-buffered switches with the guaranteed-rate property," and A Hung et al, Proc. IEEE ISCC '98, Athens, July 1998, pp 331-335). The first approach applies at the connection-level, where bandwidth guarantees are required. A suitable algorithm must satisfy two conditions for this; firstly it must ensure no overbooking for all of the input ports and the output ports, and secondly the fabric arbitration problem must be solved by allocating all the requests for time slots in the frame.

Fabric arbitration has to date been proposed by means of the Slepian-Duguid approach and Paull's theorem for rearrangeably non-blocking, circuit-switched Clos networks (see Chapter 3, J Y Hui, Switching and traffic theory for integrated broadband networks, Kluwer Academic Press, 1990). This connection-level algorithm can be summarised as firstly ensuring no overbooking and secondly performing fabric arbitration by means of circuit-switching path-search algorithms. It has been assumed that this algorithmic approach could only be applied at the connection level, because of its large computational complexity. For this reason, proposals for scheduling of connectionless, best-efforts packets or cells employ various matching algorithms, many related to the "marriage" problem (see D Gale and L S Shapley, "College admissions and the stability of marriage," Mathematical Monthly, 69, 9-15 (1962) and D Gusfield and R W Irving, The Stable Marriage Problem: Structure and Algorithms, MIT Press, 1989) in which the input-output connections for each time slot or phase of the switch are handled independently, i.e. a frame of time slots (and hence phases) is not employed. Although such algorithms for choosing a set of conflict-free connections between inputs and outputs for each time slot, which are based on maximum size and maximum weight bipartite graph matching algorithms, can achieve 100% throughput (N McKeown et al, "Achieving 100% throughput in an input-queued switch," Proc. IEEE Infocom '96, March 1996, vol. 3, pp. 296-302) they are also impractically slow, requiring running times of complexity $O(N^3 \log N)$ for every time slot (R E Tarjan, "Data structures and network algorithms," Society for Industrial and Applied Mathematics, Pennsylvania, November 1983).

Iterative, heuristic, parallel algorithms such as iSLIP are known, which reduce the computing complexity (i.e. time required to compute a solution) for best-efforts packets or cells (N McKeown et al, "The Tiny Tera: a packet switch core," IEEE Micro January/February 1997, pp 26-33). The iSLIP algorithm is guaranteed to converge in at most N iterations, and simulations suggest on average in fewer than $\log_2 N$ iterations. Since no guarantees are needed, this and similar algorithms currently represent the preferred scheduling technique for connectionless data at the cell level in input-buffered cell switches and packet routers with large numbers of ports (e.g. $N \geq 10$). The iSLIP algorithm is applied to the Tiny Tera packet switch core, which employs Virtual Output Queueing (VOQ), in which each input port has a separate FIFO (First In, First Out) queue for each output, i.e. $N^2$ FIFOs for an N×N switch. If we assume that each FIFO queue stores at least a number of cells equal to the average cell latency L, and that each cell is a 53-byte ATM cell, then the total input FIFO queue hardware count is $O(424LN^2)$. With each element capable of clocking out 424f bits per frame, this is a complexity product of $O((424)^2 fLN^2)$, which is a very large complexity. Fortunately, by employing a single queue in the form of RAM in each port, acting as N virtual queues, the hardware count can be reduced to $O(424LN)$, and with parallel readout reducing the number of steps per frame to just f, the overall complexity product can be reduced to $O(424fLN)$. Table 1 gives the hardware and "computing" steps for these queues to provide f cells within a frame.

Figure 1:
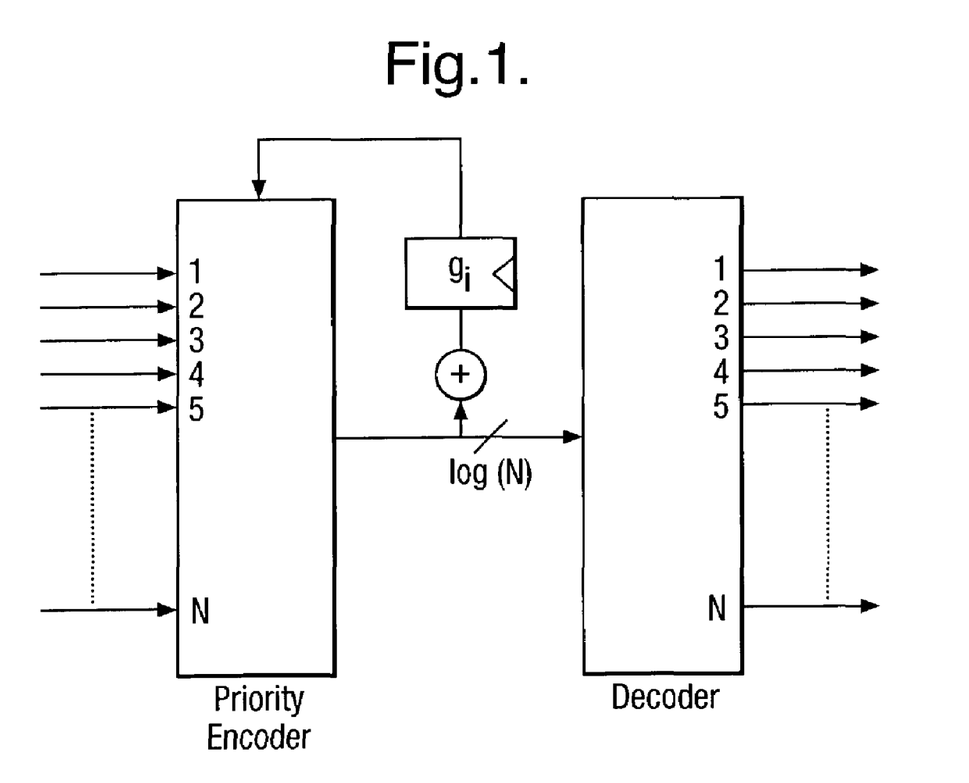
FIG. 1 is a schematic depiction of a known arrangement for allocating switch requests.

For unicast packets the iSLIP algorithm converges in at most N iterations, where N is the number of input and output ports. On average the algorithm converges in fewer than $\log_2 N$ iterations. The physical hardware implementation employs N round-robin grant arbiters for the output ports and N identical accept arbiters for the input ports. Each arbiter has N input ports and N output ports, making $N^2$ links altogether. The total amount of hardware depends on the precise construction of the round-robin arbiters. N McKeown et al, op cit, employ a priority encoder to identify the nearest request from the port closest to a pre-determined highest-priority port (see FIG. 1). The priority encoder reduces the number of links down to $\log_2 N$ parallel links, in order to change the pointer if required. The $\log_2 N$ parallel links are then expanded back up to N links again through a decoder. Details of the hardware complexity of the arbiters are given in N McKeown, Scheduling Algorithms for Input-Queued Cell Switches, PhD Thesis, University of California, Berkeley, 1995. The growth rate for the complete scheduler is $O(N^4)$, each arbiter being $O(N^3)$. For a 32×32 cell switch (which is the size of the Tiny Tera switch), 421,408 2-input gates are required. This may be quite acceptable for such a small switch, but the $O(N^4)$ growth rate is extremely large.

In order to minimise the overall hardware and computing complexity, the best structure for constructing the encoder is a binary tree, which requires $O(2N)$ elements (for large N) and only $\log_2 N$ steps per iteration, whilst the decoder needs only $O(N)$ elements. Pipelining cannot be employed to reduce to one step per iteration, because the pointers cannot be updated until the single-bit requests have passed through both sets of arbiters to the decision register. The total hardware and computing complexities are given below in Table 1. The hardware complexity now grows as $O(N^2)$ rather than $O(N^4)$, due to the binary tree encoder and decoder.

TABLE 1

Hardware and computing complexities of the iSLIP algorithm for scheduling f packets per port in a frame of f time slots.

| | Hardware Count | Computing Steps per Frame | Hardware.Computing Complexity Product |
|---|---|---|---|
| Input RAM queues | 424LN | f | 424fLN |
| Average Convergence | $O(6N^2)$ | $O(4f\log_2 N(1 + \log_2 N))$ | $O(24fN^2\log_2 N(1 + \log_2 N))$ |
| Guaranteed Convergence | $O(6N^2)$ | $O(4fN(1 + \log_2 N))$ | $O(24fN^3(1 + \log_2 N))$ |

The overall hardware.computing complexity product $O(24fN^3(1+\log_2 N))$ of the iSLIP algorithm for scheduling f packets per port would be no less than that of the maximum size and weight matching algorithms of N McKeown, et al "Achieving 100% throughput in an input-queued switch," Proc. IEEE Infocom '96, March 1996, vol. 3, pp. 296-302., if convergence must be guaranteed. There is a reduction to $O(24fN^2 \log_2 N(1+\log_2 N))$ for the average number of computing steps. The major benefit of the iSLIP algorithm is its parallel nature, which allows the number of computing steps to be traded against hardware complexity, thus reducing computing times by a factor $N^2$ at the expense of increasing the hardware by the same factor. It is interesting to note that hardware quantities for the input RAM queues far exceed those needed for the scheduling electronics.

SUMMARY

According to a first aspect of the invention there is provided a method of a method of allocating switch requests within a packet switch, the method comprising the steps of (a) establishing switch request data at each input port;

(b) processing the switch request data for each input port to generate request data for each input port-output port pairing;

(c) comparing the number of requests from each input port and to each output port with the maximum request capacity of each input port and each output port;

(d) allocating all requests for those input-output pairs where the total number of requests is less than or equal to the maximum request capacity of each input port and each output port;

(e) reducing the number of requests for those input-output pairs where the total number of requests is greater than the maximum request capacity of each input port and each output port such that the number of requests is less than or equal to the maximum request capacity of each input port and each output port; and (f) allocating the remaining requests.

According to a second aspect of the invention there is provided a method of allocating switch requests within a packet switch, the method comprising the steps of;

(a) establishing switch request data at each input port;

(b) processing the switch request data for each input port to generate request data for each input port-output port pairing;

(c) allocating a first switch request from each of the input port-output port pairing request data, the requests being allocated only if the maximum request capacity of the respective output port has not been reached; and (d) allocating further switch requests by the iterative application of step (c) until the maximum request capacity of each output port has been reached.

The present invention additionally provides a method of allocating switch requests within a packet switch, the method comprising the steps of;

(a) establishing switch request data at each input port;

(b) processing the switch request data for each input port to generate request data for each input port-output port pairing;

(c) identifying a first switch request from each of the input port-output port pairing request data;

(d) identifying further switch requests by the iterative application of step (c) until all of the switch request data has been identified;

(e) subject to the maximum request capacity of each input port and each output port, allocating all of the identified switch requests; and (f) reserving unallocated switch requests for use in the next phase of switch request allocation.

BRIEF DESCRIPTION OF DRAWINGS

The invention will now be described with reference to the following figures in which.

DETAILED DESCRIPTION

As the scheduling of best-effort, connectionless cells within an input-buffered switch, router or network is bring considered, each of the input ports could be assumed to have a FIFO queue, each of which is destined for a different output port (i.e. virtual output queueing—VOQ). Although the flows are best-effort, we wish to schedule them on a frame-by-frame basis. However, there is no pre-reservation of time slots within this frame, thus a number f of cells are queued at each input port, in f time slots, and are being scheduled according to their output port destinations in such a way as to avoid contention. A particular cell or packet should be able to be transmitted across the switch fabric during any one of f time slots. Before performing fabric arbitration to ensure that there is no output port contention in each time slot, we must first make sure that there is no overbooking of the input and output ports within the frame.

If the total number of cells Nf (where N is the number of input ports and f is the number of time slots in a frame) to be switched across a cell or packet switch are to be computed together on a frame-by-frame basis, by means of a path-searching algorithm for a 3-stage circuit switch, then every cell could be represented as a port on the circuit switch. The number of computing steps needed to ensure no overbooking then depends on the amount of hardware that is acceptable. If $O(fN \log_2(fN))$ components are used, then $O(fN)$ computing steps are needed. The number of computing steps can be reduced to $O(\log_2^2(fN))$ if more hardware is acceptable, i.e. $O(fN \log_2^2(fN))$, using a Batcher sorting network, but this hardware quantity may be too large to be acceptable. However, to represent every cell as a port on a circuit switch is an over-restrictive constraint in a cell switch. In fact, in a cell switch, it is only necessary to ensure that the number of cells destined for each of the N output ports does not exceed the number of cells or time-slots in the frame as there is no requirement to exit the output port in any specific time-slot.

The present invention concerns a method of for ensuring no overbooking of the input and/or output ports. An N×N request matrix R is defined, whose elements $r_{i,j}$ represent the number of cells in input port i destined for output port j. The two conditions that ensure no overbooking are simply:

$$\sum_{j=1}^{N} r_{i,j} = f \text{ for all } i \text{ and } \sum_{i=1}^{N} r_{i,j} = f \text{ for all } j$$

In practice, cells from more than f time slots in each input port could be considered in this procedure, if cells destined for overbooked ports have to be discarded. Discarded cells could either be lost completely, or continue to be queued for later attempts.

Figure 2:
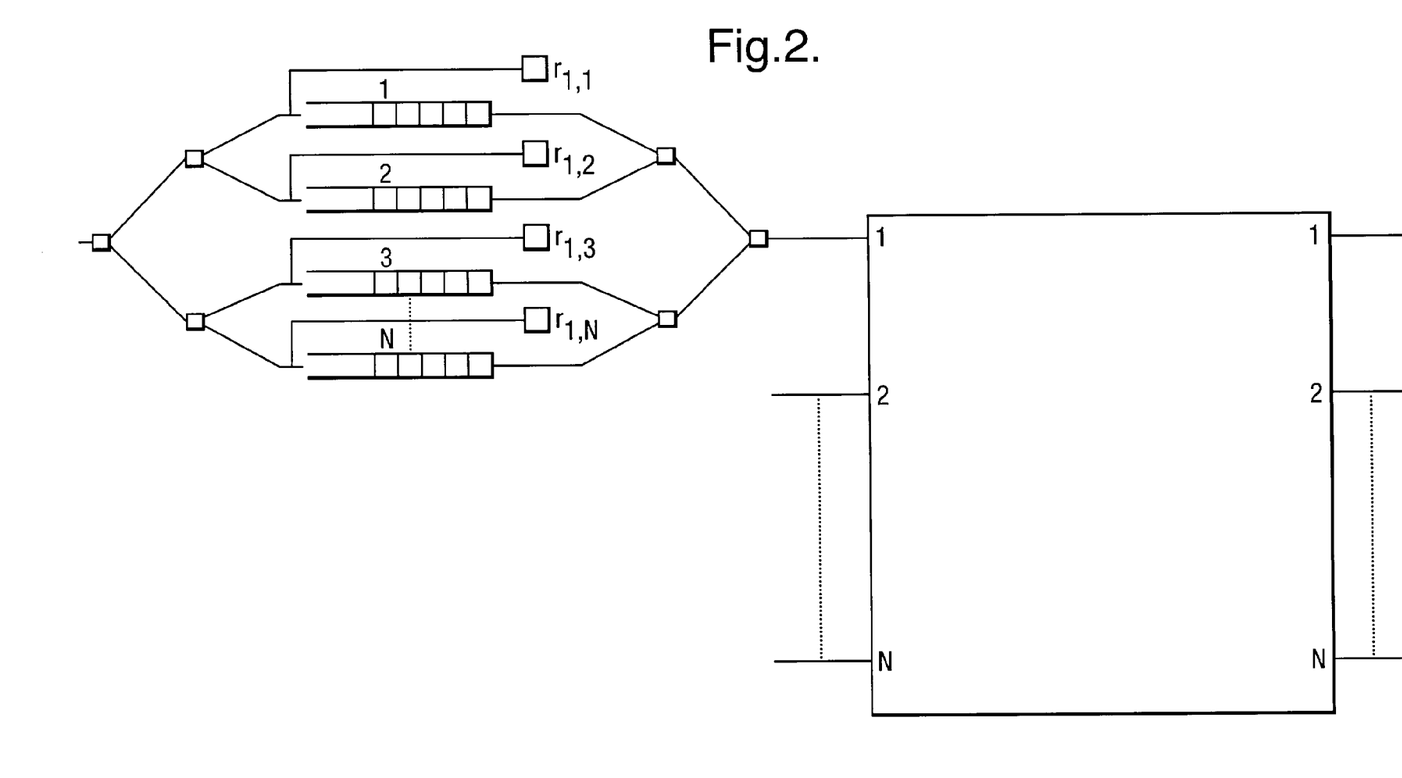
FIG. 2 is a schematic depiction of an apparatus for counting switch requests according to the present invention.

In order to establish the number of request matrix elements, $N^2$ counters are established, one for each queue. FIG. 2 shows a schematic depiction of a possible input port arrangement for counting the request matrix elements, $r_{i,j}$. Each of the N input ports 10 to a switch fabric 20 has N FIFO queues 11, N counters 12 and N switches 13 in order to direct cell requests to the appropriate counter 12. Assuming just f cells in each port are counted within the request matrix, each counter then requires $\log_2(f+1)$ counting stages, requiring $O(N^2 \log_2 f)$ counter elements altogether. If it is assumed that the individual cell destination requests are input to these counters as single bits, there will be a maximum of O(f) computing steps required of any counter, giving an overall hardware.computing complexity product for the counters of $O(fN^2 \log_2 f)$, FIG. 2 shows that we also require O(N) switches in each input port to direct the cell requests to the correct counter, i.e. $O(N^2)$ in total. The speed of these switches must be sufficient that, within one frame of f slots, $f \log_2 N$ bits can be routed. The overall complexity product for the switches is therefore $fN^2 \log_2 N$.

The method of queueing cell requests can be refined further. In FIG. 2, each port has N FIFO queues, each capable of buffering up to f cells. This requires $O(fN^2 \log_2 N)$ buffer elements, each capable of toggling $f \log_2 N$ times per frame, i.e. a complexity product of $O(f^2N^2(\log_2 N)^2)$. Fortunately, by employing a single queue in the form of RAM in each port, acting as N virtual queues, the hardware count can be reduced to $O(fN \log_2 N)$, with the same number of steps per frame, requiring a complexity product of $O(f^2N(\log_2 N)^2)$ overall. Since a particular cell stored in RAM will be allocated to any of the f time slots within the frame, re-ordering may now also be required in an output queue if it is desired to preserve the cell order between input and output ports. This is now in essence the same as traditional time-slot interchanging in time-shared circuit switches. However, it would be possible to preserve the cell order of a virtual input queue by allocating time slots in time order to the cells destined for the same output port. Even with efficient buffering in a single queue within each input port, cell buffering is the most complex function in a switch, requiring the largest quantity of the fastest electronics. The cells here are just the request cells, containing only output port destination addresses (and possibly input port addresses as well as other parameter values). Much greater buffering complexity is needed for the actual cells or packets carrying all the header information and payload.

Figure 3:
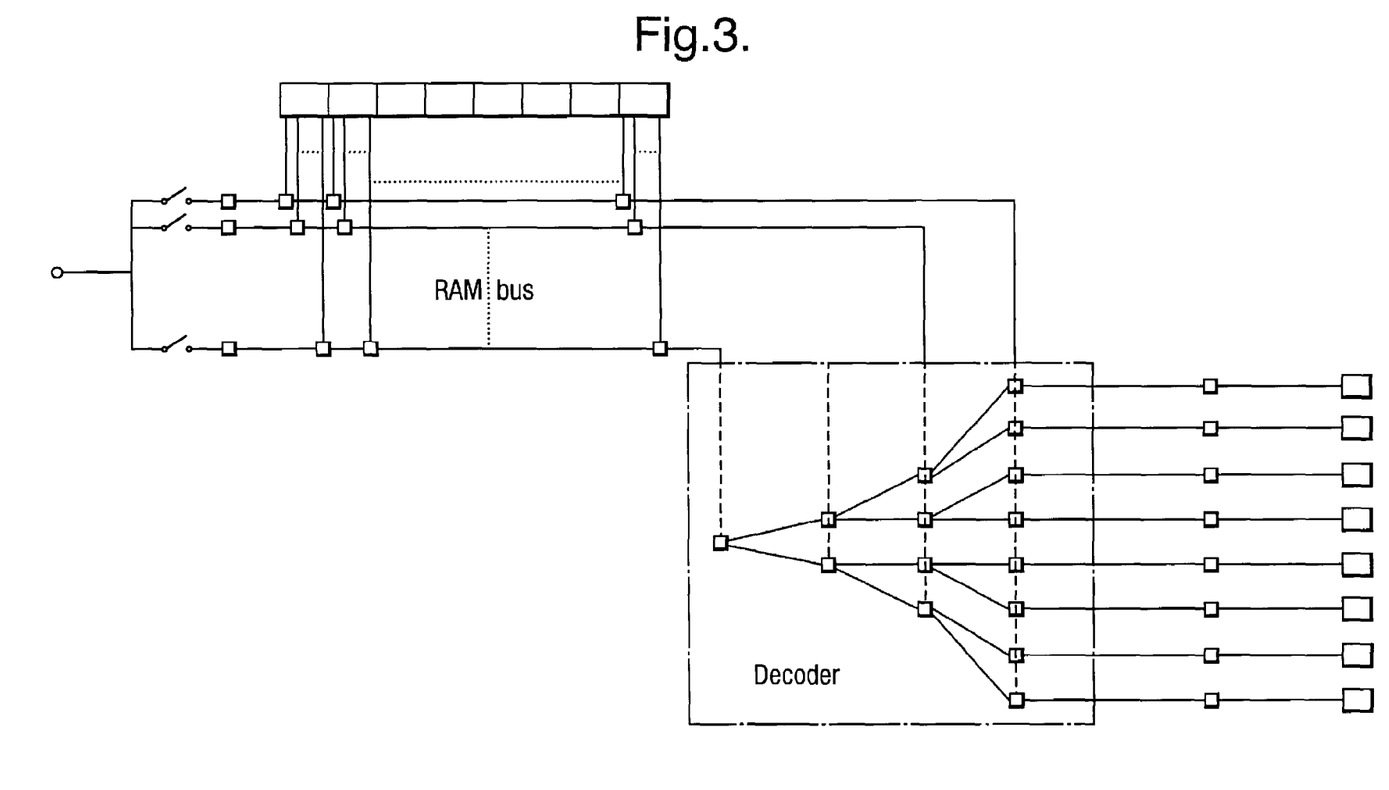
FIG. 3 is a schematic depiction of a second apparatus for counting switch requests according to the present invention.

FIG. 3 shows an improved arrangement for counting the request matrix elements. A serial input stream of cell requests is converted to a parallel word, which is then transmitted over a parallel bus 31. Each line of the parallel bus is connected via gates 32 to sections of the RAM 33, each RAM section 34 holding an individual cell request of $\log_2 N$ bits. Each RAM section can both read and write cell requests from and to the parallel bus. As the cell requests are written into RAM sections 34, they are also decoded into single-bit requests by the decoder 35 and transmitted to the array of counters 36. Each input port requires an array 36 having N counters, so the requirement for an N×N switch is $N^2$. The overall complexity product, which was previously dominated by the RAM queues, is now reduced by a factor $\log_2 N$, which for large N could be an order of magnitude. This reduction is in terms of RAM access speeds, rather than quantity of buffer memory.

Figure 4:
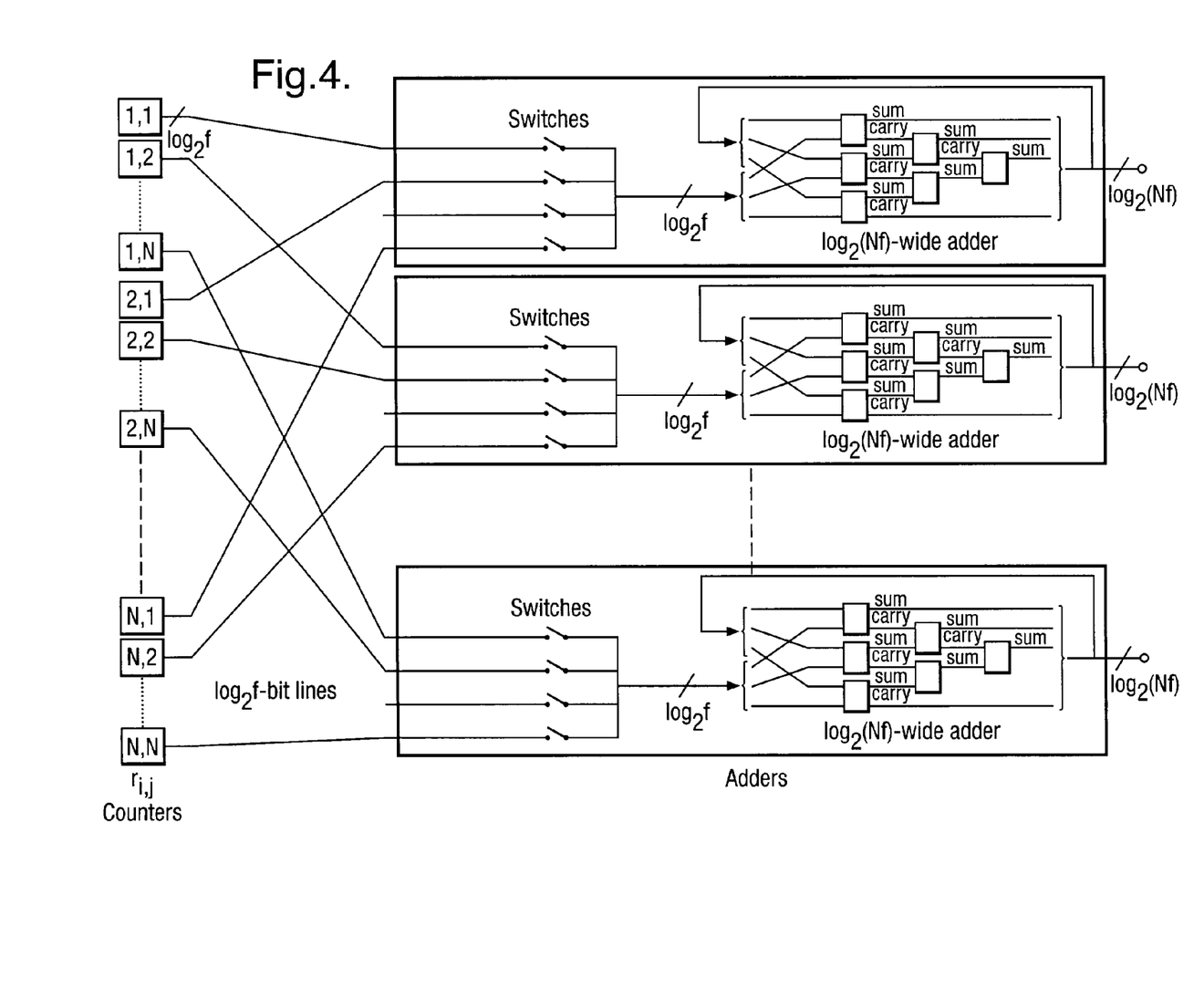
FIG. 4 is a schematic depiction of an apparatus for counting the switch requests for each output port of a packer switch according to the present invention.

Once all of the matrix elements have been counted, the next step of the method of the present invention is to add the request matrix elements $r_{i,j}$ to form the sum of the requests for each output port of the switch. If more than f requests are taken into account, then the sum of the requests from each input port must also be calculated. FIG. 4 shows an array of $N^2$ counters 41, each containing the number of requests for switching from a given input port to a given output port, e.g. counter [1,2] holds requests for switching from the first input port to the second output port and counter [1,N] holds requests for switching from the first input port to the Nth output port. The outputs from the counters 41 feed into an array of N adders 42, with each adder corresponding to one of the output ports of the switch fabric. Thus, the outputs of the counters which hold requests for switching to the first output port all connect to the input of the adder 42 which is associated with the first output port of the switch fabric. The counts may be represented as $\log_2$ f-wide words, each of which must be switched successively to the adder circuitry 43 by an associated switch array 44. For conventional adder constructions the software and hardware complexities are no greater than for counting the individual request matrix elements.

The third step of the method of the present invention is to compare the summations for each output port with f, which is the maximum number of cells that can be sent from each input port and to each output port in each frame. If any row or column of the request matrix exceeds f, the number of requests must be reduced to no more than f. One method of achieving this is to reduce the number of allowed requests to a number proportional to the actual number of requests, i.e.

$$r'_{i,j} = \frac{f}{\sum_i r_{i,j}} \cdot r_{i,j}$$

This step is efficient when the there is a heavy concentration of requests on one, or a few, input or output ports. However, if the traffic is distributed uniformly from inputs to outputs, such that each element has a small number of requests, then the method is less efficient. In an alternative embodiment of the present invention, the requests are allocated in the following manner. Allocation of requests must be performed fairly, so that every request has a chance of being granted within the frame, while satisfying the "no overbooking" condition, to keep the average delay seen by individual requests low. Furthermore, every virtual output queue must have a chance of being granted a request within the frame, to prevent starvation. To fulfil these requirements, each $r_{i,j}$ from all input ports must be granted at least one request, if they ask for one or more requests. as one port, can not be granted a large number of requests while other ports are granted none.

The tasks of summing requests and then reducing the number of requests as necessary are now replaced by a single mechanism which iteratively counts up the requests by granting one at a time to all $r_{i,j}$ counters, until the sum of the requests destined for any output port equals the number f of slots in the frame. At that point no more requests can be granted to that output. On the first iteration, all request matrices, $r_{i,j}$, with one or more requests for a given output port j are granted one of these requests, so that up to N requests may be granted in the first iteration (assuming here that f≧N). Each of the non-zero request matrix, $r_{i,j}$, counters is now decremented by one, (i.e. a 1 is subtracted from each $\log_2$ f-wide word) ready for the next iteration. Meanwhile, the successful requests granted to each output port, which are indicated as single bits in parallel from each $r_{i,j}$ counter, are summed, for example by an adder with parallel input ports, converting the individual granted request bits into a word of length $\log_2(2N)$ bits.

Figure 5:
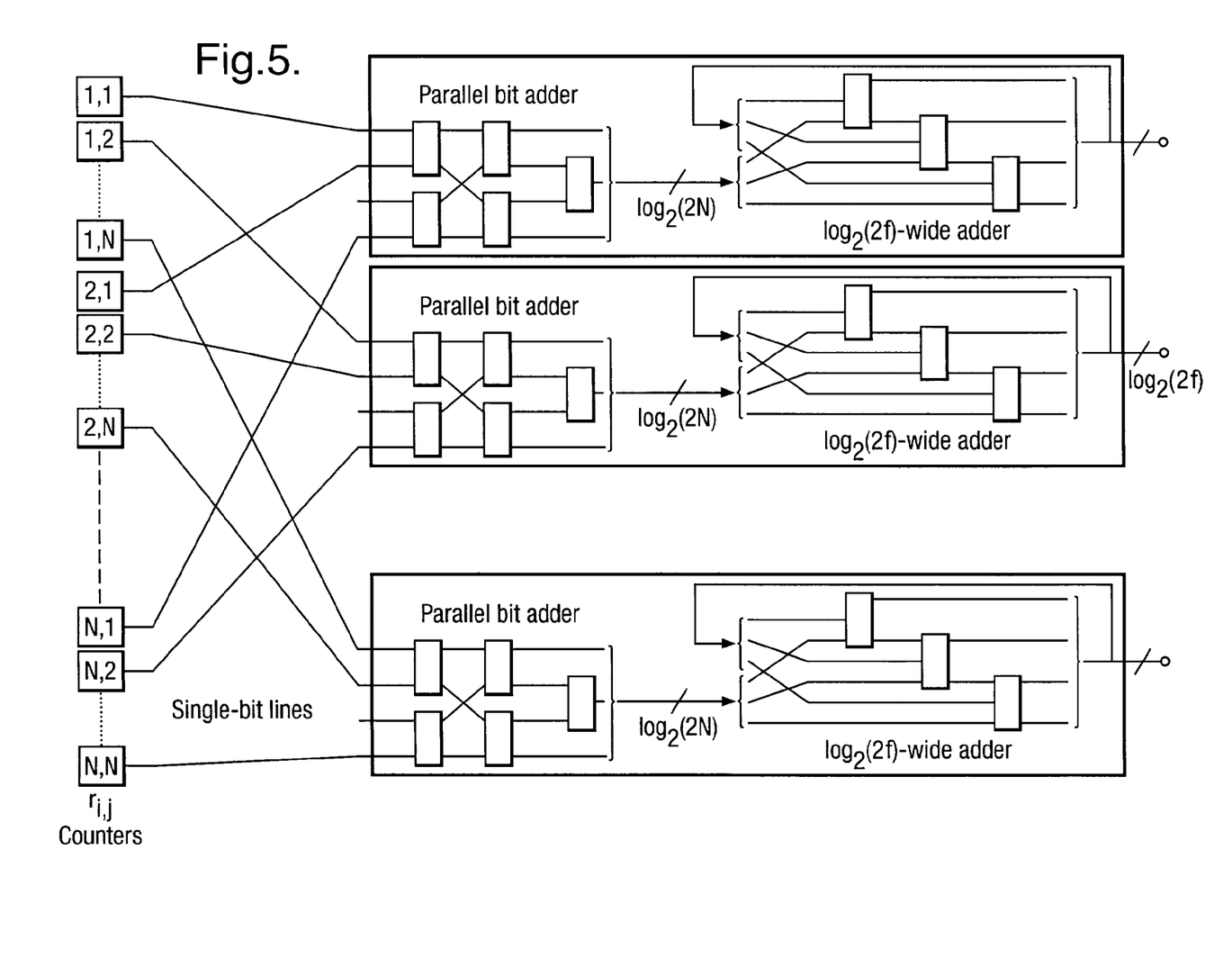
FIG. 5 is a schematic depiction of an apparatus for counting the switch requests for each output port of a packer switch according to an alternative embodiment of the present invention.

FIG. 5 shows a circuit which can be used to implement the alternative embodiment of the invention. The circuit includes an array of $N^2$ request matrices 41 (as shown in FIG. 4 and described above) and N adding elements 51. The adding elements 51 each comprise a parallel bit adder 52 which receives in parallel the single bit requests from each associated request matrix 41 and creates a $\log_2$ (2N)-wide word. The output of each parallel bit adder 52 is connected to a respective $\log_2$(2f)-wide adder 53.

There are N such parallel adders 52, each of which requires 4N binary adders. The number of steps required in each iteration to obtain the sum of the requests is $\log_2 N.\log_2(2N)/2$. Those $r_{i,j}$ counters that have a second request for a given output port have a second single bit summed through the parallel adders in a second iteration of the process described above. Altogether there could be as many as f iterations, if only one input port has requests destined for any one of the output ports. At the other extreme, for a uniform traffic distribution where a given output receives cells from different inputs, there could be just one iteration required. Because there is no buffering within the parallel adders, pipelining can be employed to sum each of the iterations. The maximum number of steps required for a maximum of f iterations is $(f+\log_2 N.\log_2(2N)/2)$. The complexities are summarised in Table 4.

At the output of each parallel adder 52 there is a temporal succession of up to f log(2N)-wide words. The successive words must also be added sequentially by the adder 53 to obtain the overall total number of requests granted to an output port. Since this number cannot exceed f (i.e. the number of time slots in the frame) this can be done using a $\log_2(2f)$-wide adder. The adder construction in FIG. 5 employs $O(\log_2^2(2f))$ half adders. Alternatively, a conventional adder construction employing $\log_2(2f)$ full adders could be used. The succession of f, log(2N)-wide words can be stored in a buffer of size f.$\log_2(2N)$, if necessary. These can then clocked out sequentially at a suitable rate via switches for the following $\log_2(2f)$-wide adder. The $\log_2(2f)$-wide adder 53 calculates the overall total number of requests granted to all input ports destined for a particular output port (and this total must not exceed f). On the iteration that drives the overall total above f, the counting must be stopped for that output port. Each request matrix, $r_{i,j}$, counter whose cell requests are destined for that output port must be advised and keep a record of the number of iterations it took part in. It will only be allowed a number of requests equal to the number of iterations for which the overall count of requests for a given output port is ≦f. If the overall total on the previous iteration is less than f, then up to N additional requests may be allocated up to the total of f (when f≧N). This can simply be done by examining the status of each request matrix, $r_{i,j}$, counter in turn in a maximum of N steps. When f<N, then up to f additional requests may be allocated. This may also take a maximum of N steps, by examining the status of each request matrix counter in turn, depending on the locations of the requests distributed around the N counters. Each of the request matrix counters now knows how many requests have been allocated to it. To maintain fairness between the input ports destined for a particular output port, a pointer may be used, so that additional requests can be allocated preferentially to different input ports in different frames. (Of course, a specific pattern of requests could be such that the same input ports are in fact allocated additional requests in different frames). There are many ways in which a pointer could be used to allocate additional requests, including existing round-robin techniques. The simplest way would be to cycle the pointer continuously around the input ports, allocating one request at a time to any requesting port, stopping when the required number of additional requests up to N has been granted. The next frame that subsequently needs to allocate additional requests then begins from that pointer position.

It would be possible to reduce the N steps required to allocate the additional requests to $O(\log_2 N)$ steps, by using an (N,N) concentrator to pack requests next to each other, so that only the required number up to N of those concentrated requests can be gated or switched through to the parallel bit adder. The concentrator construction should preferably be such that the relative positions of the requests are preserved at the output of the concentrator, like that in T Szymanski, "Design principles for practical self-routing non-blocking switching networks with O(N log N) bit-complexity," IEEE Trans. On Computers, vol. 46, no. 10, 1057-1069 (1997). The gating or switching of the concentrator outputs could be achieved by means of a modified $\log_2$ N-stage decoder, which not only produces, for example, a logic "1" on the appropriate numbered decoder output port (controlling the concentrator output port), to represent the last of up to N ports to be allowed through to the adder, but also propagates through its $\log_2$ N stages a logic "1" to all decoder outputs (and controlled concentrator outputs) that lie above the last of up to N ports. In this way all decoder output ports above and including the decoded one provide enable bits ("1"s) to the concentrator output ports that they control, and all the decoder ports below the decoded one provide disable bits ("0"s) to the concentrator output ports that they control. Because the pointer could be in any of the N counter positions, and we wish preferably to allow through requests starting from the pointer position, the process of allocating additional requests could be split into two steps.

In the first, only the requests including and below the pointer position are sent to the concentrator for gating or switching through to the adder. Disabling of the requests above the pointer position can be performed by a similarly modified decoder. In the second part, only those requests lying above the pointer position are allowed through to the concentrator. The overall hardware complexity required for the concentrator and decoder using this construction is $O(3N^2 \log_2 N)$, and the number of computing steps using Szymanski's concentrator construction is $O(8 \log_2 N)$.

In a further alternative embodiment of the present invention, the counting and summing of requests could be performed as described above, except that the counting and summation may continue beyond the iteration that drives the overall total of requests above f for a particular output port, so that the complete total of requests can be counted. The $\log_2(2f)$-wide adder would now need to be a $\log_2(2fN)$-wide adder, with a hardware count of N $\log_2(2Nf).\log_2(4Nf)/2$; computing steps O(f $\log_2(2Nf)$); and overall complexity product O(Nf $\log_2^2(2Nf).\log_2(4Nf)/2$). Furthermore, it could also be possible for the counters to hold cell request counts from previous frames, and to add these to the counts of each new frame. This would allow running totals, or perhaps weighted averages, to be used covering longer time-slots than a single frame, if cell queue lengths employed are longer than a frame length. The number of cell acceptances between input and output ports could then be calculated on perhaps a fairer basis related to longer-term flows between input and output ports.

Indeed, whether the actual queue lengths employed are longer than the frame length or not, i.e. even if unsuccessful cells are discarded within each frame, it may be advantageous for the number of cell acceptances within each frame to be related to such a longer-term measure of traffic flow requests between ports, rather than just the cell requests within the frame itself. Of course the number of cell acceptances could also be related to a combination of longer-term flow and "within frame" requests.

Once the number of requests $r_{i,j}$ allocated between each input and output port within a frame is known, the individual cell requests buffered in the RAM queues must be identified. This can be achieved by re-running the individual cell requests out of the RAM queues, through the decoder switches and re-counting them in the request matrix counters. This time, each counter is set at its allocated total, and can be decremented by each cell request bit that it receives. While the counter is still above zero, a single bit (e.g. a "1") is sent back to the RAM queue to the cell position corresponding to the current request bit, signifying cell acceptance. When a cell request bit decrements the counter to zero, and for all subsequent request bits, a single bit (e.g. a "0") is sent back to the appropriate RAM queue cell position to signify non-acceptance of that particular cell request. The status (accepted or rejected) of all cell requests stored in RAM queues is now established. The hardware and computing complexities are the same as for the first count of matrix elements $r_{i,j}$, except that an additional N(N+f) switches are needed. The additional number of steps required through these is f. All accepted cell requests are now ready to have their time slots calculated for transmission across the switch fabric (fabric arbitration).

Excluding the necessary cell or packet buffering in RAM queues, for which there is no essential difference, the hardware.computing complexity product of the method of the present invention is O($\log_2$ N) smaller than iSLIP for all hardware items. Taking the worst values across all hardware items, again excluding cell buffering, this actually translates into fewer computing steps than iSLIP by the same factor O($\log_2$ N), but at the expense of greater hardware quantities by the same factor O($\log_2$ N) for some of the hardware items. Nevertheless, the hardware quantities required for the method of the present invention are much smaller than the cell buffering hardware.

Figure 6:
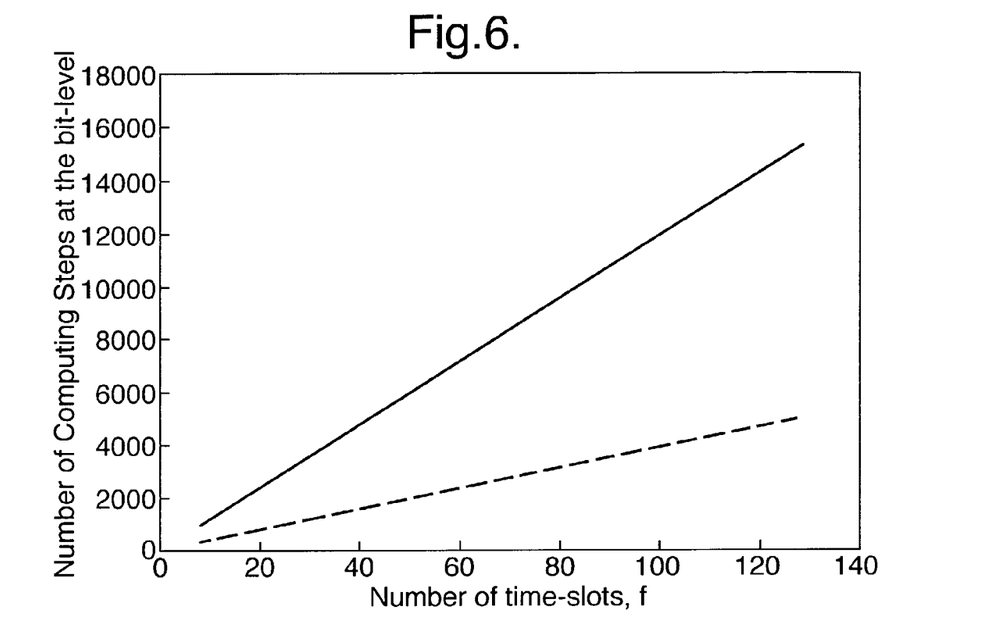
FIG. 6 is a graph comparing the performance of the iSLIP algorithm with that of the present invention.
Figure 7:
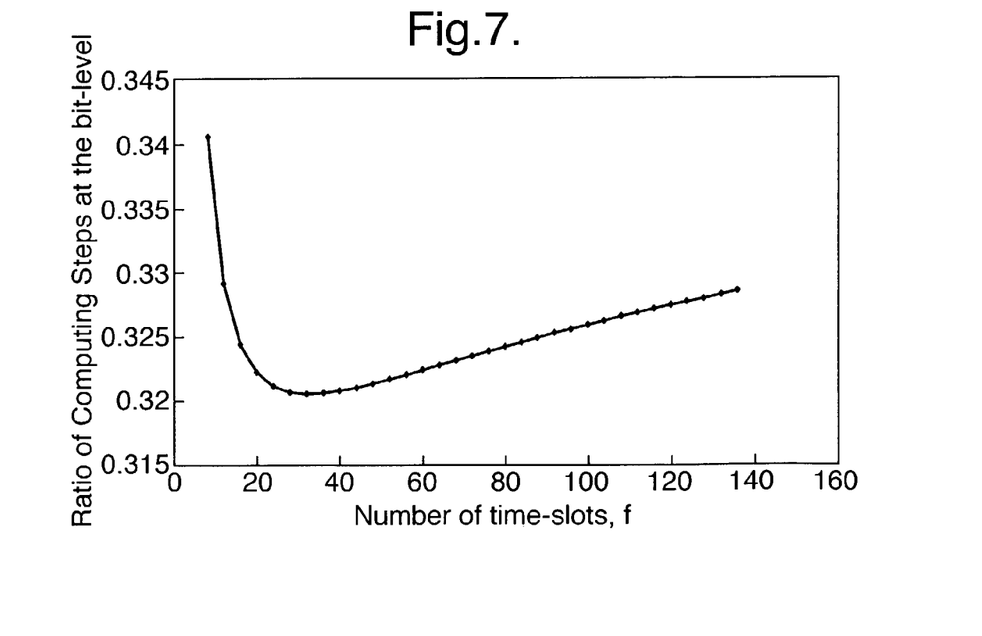
FIG. 7 is a graph showing the performance ratio of the iSLIP algorithm to that of the present invention.
Figure 8:
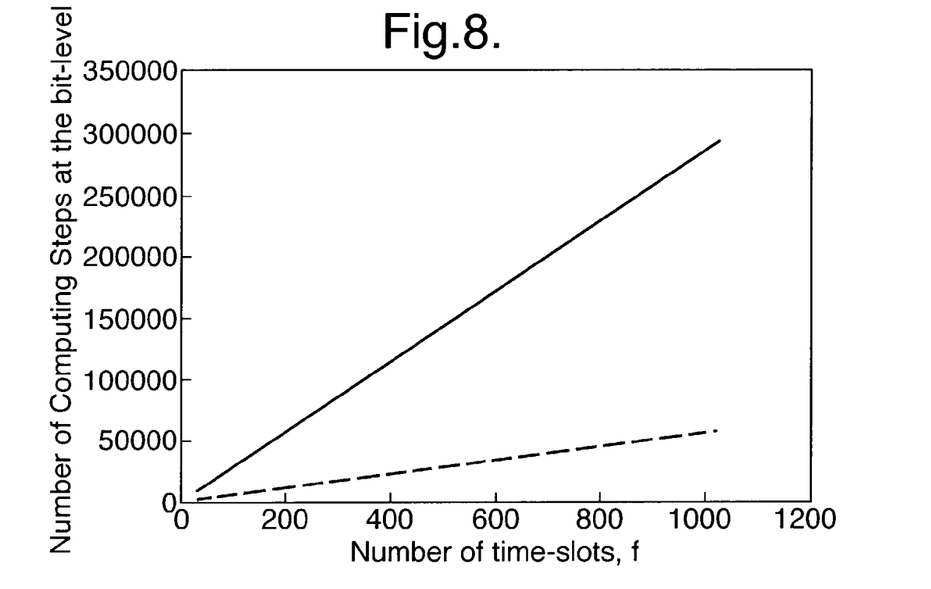
FIG. 8 is a second graph comparing the performance of the iSLIP algorithm with that of the present invention.
Figure 9:
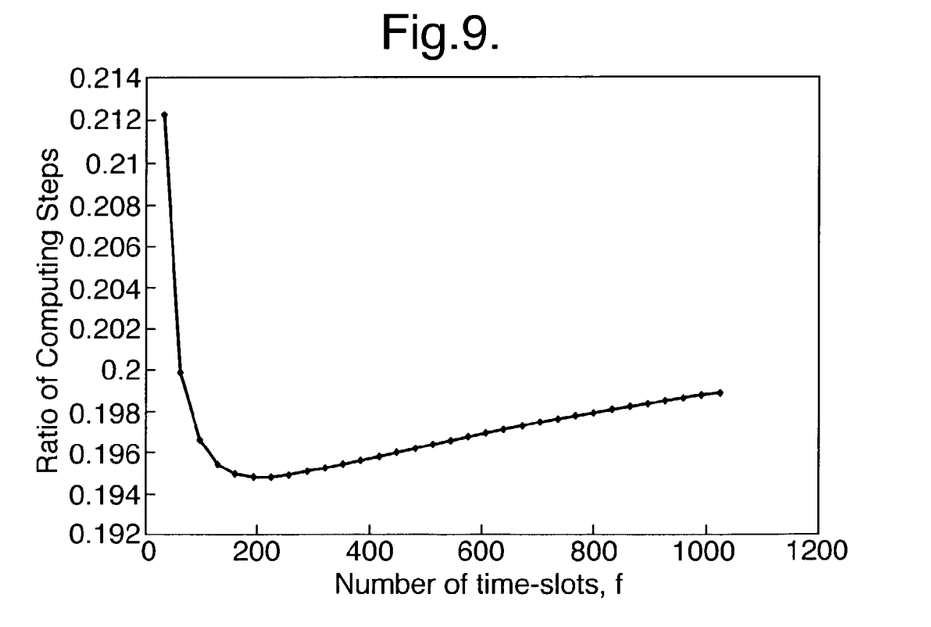
FIG. 9 is a second graph showing the performance ratio of the iSLIP algorithm to that of the present invention.

FIG. 6 shows the number of computing steps for the iSLIP algorithm with average convergence [solid line] and the method of the present invention [dashed line], for a small switch with N=32 input and output ports, as a function of the number of time slots f under consideration. FIG. 7 shows the ratio of computing steps for the two algorithms, which reaches a minimum of 0.32 for f=32 time slots. Although this means that the method of the present invention is more-than three times as fast an algorithm as iSLIP, it does require cells to be buffered for 32 time slots to achieve this minimum ratio. However, the ratio is around 1/3 for all numbers of time-slots from 8 upwards, so any desired cell latency could be chosen. The benefits of a frame-based algorithm become more significant for switches with more ports N. FIGS. 8 and 9 show the equivalent graphs as FIGS. 6 and 7 for the case where N=256 ports. Here, the method of the present invention takes only 0.195 times the iSLIP computing time at minimum, requiring an optimum f=192 time slots. Once again, the practical number of time slots can be anything from 64 upwards, yet still provide around a 5-fold speed advantage. Thus significant computing time reductions are achievable even if the number of time slots f employed is made equal to the number of ports N.

The overall hardware.computing complexity product of the method of the present invention is of order N times smaller than a maximum weight matching algorithm. In comparison, the iSLIP algorithm having average convergence is only O(N/ $\log_2$ N) smaller.

The invention claimed is:

1. A method of allocating switch requests within a packet switch, the method comprising the steps of
   (a) collecting switch request data at each input port, the switch request data including the number of switch requests to and from each port;
   (b) processing the switch request data for each input port to generate a request queue for each input/output port pairing;
   (c) comparing the total number of requests from each input port with a predetermined maximum request capacity of that input port, and comparing the total number of requests to each output port with a predetermined maximum request capacity of that output port; and
   (d) satisfying all requests for input/output port pairings in respect of which both the input port and the output port do not exceed the maximum total number of requests for that port;
   (e) for each input/output pairing in respect of which either or both the input port and the output port exceeds the maximum total number of requests for that port, reducing the number of requests in the queue such that the number of requests remaining in respect of each input port and output port is less than or equal to the maximum request capacity of that port; and
   (f) satisfying the remaining requests.

2. A method of allocating switch requests within a packet switch as in claim 1, wherein unsatisfied switch requests are reserved for use in a subsequent next phase of switch request allocation.

3. A method of packet switching wherein the input/output port routing is allocated according to the method of claim 1 and the packets are switched on the basis of the allocated routing.

4. A packet switch in which switch requests for the input/output port routing is allocated in accordance with the method of claim 1.

5. A packet switch according to claim 4, wherein packets are switched from an input port to a specified output port in accordance with the allocated routing.

6. A method of packet switching wherein the input/output port routing is allocated according to the method of claim 2 and the packets are switched on the basis of the allocated routing.

7. A packet switch in which switch requests for the Input/output port routing is allocated in accordance with the method of claim 2.

* * * * *